United States Patent [19]
Beach

[11] 3,967,142
[45] June 29, 1976

[54] PIEZOELECTRIC CRYSTAL FIRING SPRING AND MOUNT

[75] Inventor: David Easton Beach, Penfield, N.Y.

[73] Assignee: Eastman Kodak Company, Rochester, N.Y.

[22] Filed: Jan. 6, 1975

[21] Appl. No.: 538,673

[52] U.S. Cl............................ 310/8.3; 310/8.7; 310/9.1
[51] Int. Cl.² ........................................ H01L 41/04
[58] Field of Search................ 310/8.3, 8.7, 9.1; 317/DIG. 11; 200/181

[56] References Cited
UNITED STATES PATENTS

| | | | |
|---|---|---|---|
| 3,366,808 | 1/1968 | Steward | 310/8.3 |
| 3,580,698 | 5/1971 | Goto | 310/DIG. 11 |
| 3,586,888 | 6/1971 | Dorfman | 310/8.3 |
| 3,655,324 | 4/1972 | Schweitzer | 310/8.7 X |
| 3,725,908 | 4/1973 | Brisbarre et al. | 310/8.3 X |

Primary Examiner—Mark O. Budd
Attorney, Agent, or Firm—T. H. Close

[57] ABSTRACT

A firing mechanism is provided in photographic apparatus for striking a pizoelectric crystal to generate electrical energy. The mechanism includes a firing spring and mount, with the firing spring being assembled and retained between two fulcrum edges in the mount. The firing spring is movable to a latched position and, when released, the firing spring moves to cause a hammer to strike the piezoelectric crystal.

6 Claims, 3 Drawing Figures

U.S. Patent   June 29, 1976   3,967,142
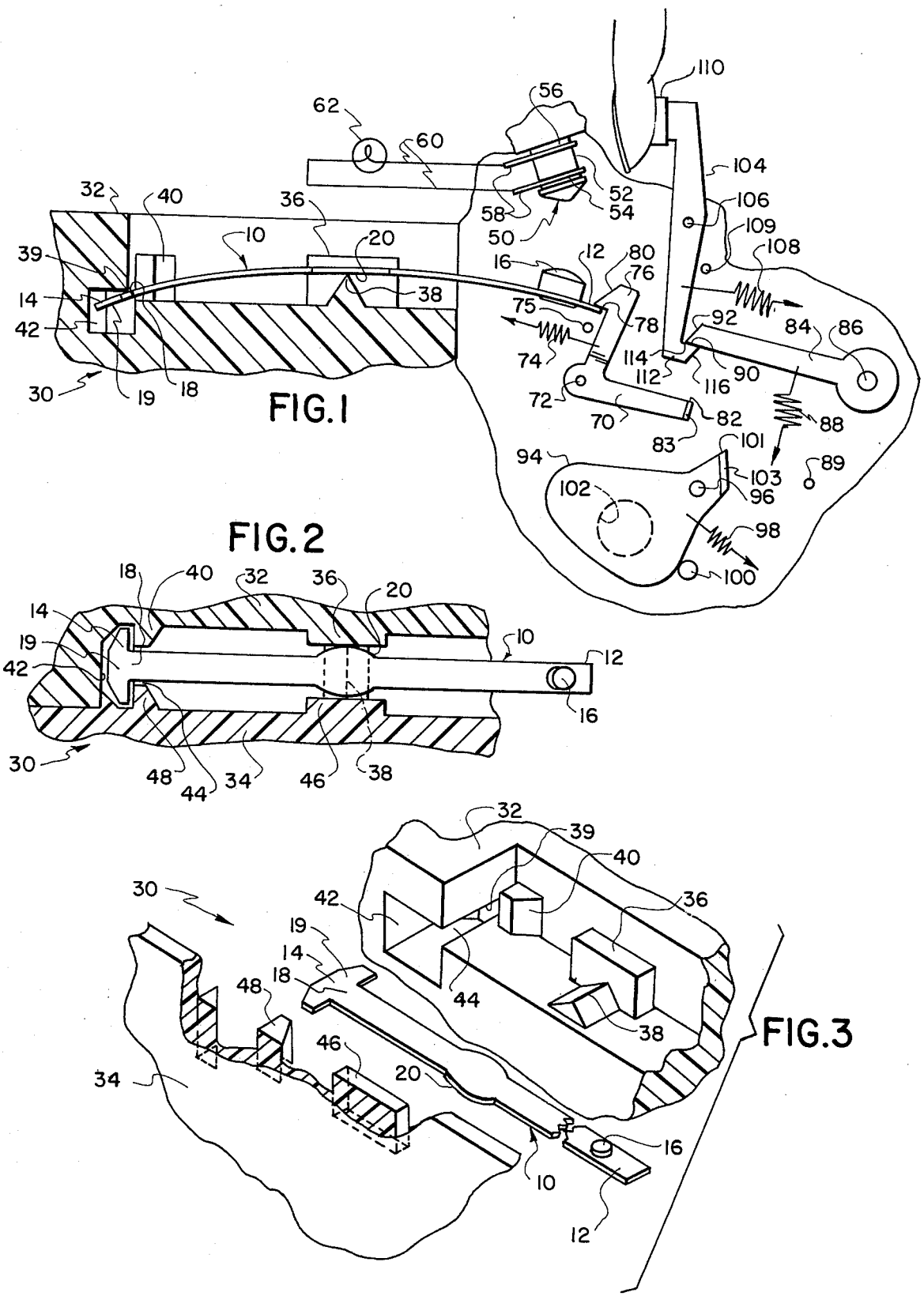

PIEZOELECTRIC CRYSTAL FIRING SPRING AND MOUNT

CROSS REFERENCE TO RELATED APPLICATIONS

Reference is made to commonly assigned, copending U.S. application Ser. No. 528,529, filed Nov. 29, 1974, in the names of Jerry L. Hargrave and Harold L. Malone; entitled CAMERA FLASH SOCKET.

BACKGROUND OF THE INVENTION

1. Field of the Invention

The present invention relates generally to photographic apparatus, and more specifically to an improved firing mechanism for use with a piezoelectric crystal in such apparatus.

2. Description of the Prior Art

It is known in the photographic arts to provide for the ignition of a flashlamp by means of an electric pulse generated by a piezoelectric crystal and to provide for the synchronization of such flash ignition with shutter operation of a camera. See U.S. Pat. Nos. 2,856,564; 2,972,937 and 3,106,080. More recently, apparatus has been developed in which a plurality of flashlamps, fireable by electric energy generated by a piezoelectric crystal, are assembled into a multilamp array. In one such array, as is disclosed more fully in the referenced, copending Application Ser. No. 528,529, all of the lamps are aligned in the same direction and each lamp has its own reflector, with a switching mechanism internal to the array for firing a particular lamp. As the piezoelectric crystal is to be struck repeatedly, it becomes necessary and desirable to provide firing mechanisms for striking the piezoelectric crystal within the camera so that a multitude of electric pulses of substantially the same magnitude and duration may be produced.

SUMMARY OF THE INVENTION

It is accordingly an object of the present invention to provide an improved firing mechanism for flash photography.

It is a further object to provide such an improved firing mechanism for use in striking a piezoelectric crystal.

It is a further object of the present invention to provide such an improved firing mechanism which may be inexpensively manufactured and assembled.

It is a further object of the present invention to provide an improved firing spring in such a firing mechanism.

It is a further object of the present invention to provide an improved mount into which such a firing spring may be inexpensively assembled during manufacturing.

These and other objects of the present invention are achieved by a firing mechanism that includes an elongated leaf spring and a simplified mount therefor. The leaf spring has formed thereon a hammer for striking the piezoelectric crystal and a pair of mounting surfaces. The mount for such a firing spring includes a pair of fulcrum edges for engagement with the mounting surfaces on the firing spring. Mechanisms are also provided for moving the firing spring to a latched position and for releasing the firing spring for movement to cause the hammer to strike the piezoelectric crystal, thereby generating electrical energy.

DESCRIPTION OF THE DRAWINGS

In the detailed description of the preferred embodiment of the invention presented below, reference is made to the accompanying drawings in which:

FIG. 1 is a front view of a firing spring and mount according to the present invention;

FIG. 2 is a top view of the firing spring and mount of FIG. 1; and

FIG. 3 is an exploded view of the firing spring and mount according to FIGS. 1 and 2.

DESCRIPTION OF THE PREFERRED EMBODIMENT

Because photographic apparatus is well known, the present description will be directed in particular to the elements forming part of, or cooperating more directly with, the present invention. Elements not specifically shown or described herein are understood to be selectable from those known in the art.

Referring now to the drawings, a firing mechanism according to the present invention comprises a firing spring 10 and a mount 30. Firing spring 10 is in the form of an elongated leaf spring having opposed ends 12 and 14. Included on one end 12 of firing spring 10 is a hammer 16 adapted to strike a piezoelectric crystal generator, shown generally as 50. Opposed end 14 of firing spring 10 includes a mounting surface 18 and a retaining portion 19, generally formed in a shape of a T for retention within mount 30 as will be described in more detail hereinafter. Intermediate opposed ends 12 and 14 of firing spring 10 is a mounting surface 20.

Referring now to FIG. 3 mount 30 for firing spring 10 may be seen in more detail. It consists of first and second molded sections 32 and 34. First molded section 32 includes a guide rib 36, fulcrum edges 38 and 39 and a retaining rib 40. Molded section 32 further defines a mounting recess 42 that is generally rectangular in transverse cross-section, and a mounting slot 44. Second molded section 34 includes a guide rib 46 and a retaining rib 48, each aligned with the corresponding member in first molded section 32. During assembly, firing spring 10 is inserted into first molded section 32 with mounting surface 20 engageable with fulcrum edge 38 and mounting surface 18 is engageable with fulcrum edge 39. Retaining portion 19 is positioned in recess 42 with firing spring 10 extending through slot 44. Retaining portion 19 is held within recess 42 by retaining rib 40. Second molded section 34 may then be brought into mating position with mounting surface 20 held between guide ribs 36 and 46 and end 14 held between retaining ribs 40 and 48. Molded sections 32 and 34 may be sealed together by a thermo-setting resin, sonic seal or other means or methods known in the art.

Piezoelectric generator 50 includes a piezoelectric crystal 52 and a pair of anvils 54 and 56, all fixedly mounted within the camera. A pair of electrodes 58 and a pair of electric leads 60 apply a generated electric pulse to a flash unit, shown schematically as 62. Flash unit 62 may take the form of a multilamp array as is disclosed in more detail in the referenced, copending U.S. Pat. Application No. 528,529; entitled CAMERA FLASH SOCKET or an electronic flash unit or other flash unit.

Provided within the camera is a latch 70, which is generally L-shaped and is movably mounted on a pin 72, fixed within the camera. Latch 70 is biased in a counterclockwise direction by a spring 74 toward a stop 75. Latch 70 includes a latch end 76 having a latch surface 78 and a cam surface 80. Latch 70 also includes an unlatching surface 82 and a cam surface 83.

A high energy lever 84 is pivotally mounted on a pin 86, fixed within the camera. High energy lever 84 is biased by a spring 88 in a counterclockwise direction toward a stop 89. High energy lever 84 includes a striking portion 90 and a cam surface 92.

A shutter 94 is movably mounted within the camera on a pin 96, fixed within the camera. Shutter 94 is biased by means of a spring 98 in a counterclockwise direction against stop 100. In the position shown in FIG. 1, shutter 94 covers an exposure aperture 102 (shown in phantom) of the camera. Shutter 94 includes an exposure surface 101 and a cam surface 103.

Also mounted within the camera is a body release lever 104, movably mounted on a pin 106, fixed within the camera. Body release lever 104 is biased by means of a spring 108 in a counterclockwise direction toward a stop 109. A tab 110 on body release lever 104 extends externally of the camera and is engageable by the operator. A latch end 112 on body release lever 104 includes a latch surface 114 and a cam surface 116.

In the position illustrated in FIG. 1, body release lever 104 retains high energy lever 84 in its energized position by engagement of latch surface 114 with striking portion 90. Moreover, latch 70 retains firing spring 10 in its latched position by engagement of latch surface 78 with end 12. Finally, shutter 94 is biased against stop 100. Upon sufficient movement of tab 110 by the operator, high energy lever 84 is unlatched and is movable under the bias of spring 88. During such movement, striking portion 90 engages unlatching surface 82 and unlatches firing spring 10 by rotating latch 70 against the bias of spring 74. Upon release, firing spring 10 moves toward piezoelectric generator 50 with hammer 16 striking anvil 54, causing generation of an electric pulse which is applied to flash unit 62, while latch 70 moves into engagement with stop 75. High energy lever 84 further engages exposure surface 101 of shutter 94, moving shutter 94 to its aperture uncovering position against the bias of spring 98. High energy lever 84 then moves into engagement with stop 89. By proper selection and timing of the engagement of latch 70 and shutter 94 by high energy lever 84, proper synchronization of flash firing and shutter actuation may be achieved.

Means may also be provided in the camera (not shown) for returning firing spring 10 to its latched position during selected portions of the operating cycle. For example, firing spring 10 may be moved by a lever movable by engagement with the camera's film advance mechanism, simultaneously with movement of high energy lever 84. After sufficient movement of firing spring 10, end 12 of firing spring 10 will engage cam surface 80 on latch 70 and will rotate latch 70 against the bias of spring 74 until firing spring 10 moves past the end of cam surface 80. Latch 70 then moves under the bias of spring 74 so that latch surface 78 engages firing spring 10 and retains it in its latched position. Meanwhile, high energy lever 84 will engage and ride over cam surface 103 on shutter 94 and then cam surface 83 on latch 70 until cam surface 92 engages cam surface 116 on body release lever 104. Continued movement of high energy lever 84 rotates body release lever 104 against the bias of spring 108 until cam surface 92 passes the end of cam surface 116 so that striking portion 90 is engaged by latch end 112. Subsequent operation of body release lever 104 will release high energy 84 for movement to its firing spring unlatching and shutter actuating position. Other means may also be provided for movement of firing spring 10 to its latched position.

Firing spring 10 is retained within mount 30 in a manner which insures maximum utilization of the energy stored in firing spring 10 for striking piezoelectric generator 50. The cooperation between mounting surfaces 18 and 20 and fulcrum edges 38 and 39 minimizes energy losses during movement of firing spring 10 from its latched position. Similarly, cooperation between retaining portion 19 and mounting recess 42 insures free movement of piezoelectric firing spring 10 to its striking position.

The invention has been described in detail with particular reference to a preferred embodiment thereof, but it will be understood that variations and modifications can be effected within the spirit and scope of the invention.

I claim:

1. A piezoelectric crystal striking mechanism comprising:
   means, including a member movable between a latched position and a striking position, for striking a piezoelectric crystal;
   means for mounting said striking means, said mounting means including a pair of fulcrum edges that are engageable with said striking means to support said member for movement between said latched and striking positions; and
   means for releasably retaining said member in said latched position.

2. A piezoelectric crystal striking mechanism including:
   a spring movable from a latched position to a striking position;
   means, including first and second fulcrum edges engageable with said spring, for mounting said spring for movement between said latched and striking positions; and
   means for releasably retaining said spring in said latched position.

3. A piezoelectric crystal striking mechanism comprising:
   an elongated spring having first and second ends, a striking surface formed on said first end, a first mounting surface formed on said second end, and a second mounting surface formed intermediate said striking surface and said first mounting surface;
   means, including first and second fulcrum edges engageable with said first and second mounting surfaces, for supporting said elongated spring for movement between a latched position and a striking position; and
   means for releasably retaining said spring in said latched position.

4. A piezoelectric crystal striking mechanism comprising:
   an elongated spring movable between a latched position and a striking position;
   means for mounting said elongated spring for movement between said latched and striking positions, said mounting means including first and second fulcrum edges positioned to engage and support said elongated spring in said latched position and at least one retaining member positioned to engage and retain said elongated spring within said mounting means; and means for releasably retaining said elongated spring in said latched position.

5. A piezoelectric crystal striking mechanism comprising:
- an elongated spring having first and second ends, a striking surface formed on said first end, a first mounting surface and a retaining portion formed on said second end, and a second mounting surface formed intermediate said striking surface and said first mounting surface;
- means for mounting said elongated spring for movement between a latched position and a striking position, said mounting means including first and second fulcrum edges engageable with said first and second mounting surfaces in said latched position and at least one retaining member positioned to engage said retaining portion; and
- means for releasably retaining said elongated spring in said latched position.

6. A piezoelectric generator mechanism comprising:
- a piezoelectric generator;
- a latch member including a latch surface, said latch member being mounted for movement within said piezoelectric generator mechanism;
- an elongated spring having a latch end and a mounting end, a first mounting surface intermediate said latch end and said mounting end, said latch end including a hammer mounted thereon and said latch end being engageable by said latch surface, said mounting end including a second mounting surface and a retaining portion, and said elongated spring being movable between a latched position in which said latch end is engaged by said latch surface and a striking position in which said hammer engages said piezoelectric generator; and
- a mount for supporting said elongated spring for movement between said latched and striking position, said mount including first and second fulcrum edges that are generally parallel and are engageable with said first and second mounting surfaces when said spring is in said latched position and said mount further including at least one retaining member engageable with said retaining portion to retain said elongated spring within said mount.

* * * * *